United States Patent [19]

Ruscus

[11] 3,867,711
[45] Feb. 18, 1975

[54] SWIMMER DETECTION SYSTEM FOR REMOTE OR LOCAL DEPLOYMENT

[76] Inventor: Paul V. Ruscus, 5601 Nebraska Ave., N.W., Washington, D.C. 20015

[22] Filed: June 25, 1973

[21] Appl. No.: 377,171

[52] U.S. Cl. .............. 340/5 R, 340/258 D, 340/261
[51] Int. Cl. ........................................... G08b 13/00
[58] Field of Search....... 343/100 CL; 340/5 R, 6 R, 340/3 R, 258 R, 258 D, 261

[56] References Cited
UNITED STATES PATENTS 2,942,247  6/1960  Lienau et al.................... 340/258 D
3,764,963  10/1973  Beck et al. ......................... 340/3 R
3,775,770  11/1973  Dillard et al................. 343/100 CL Primary Examiner—Richard A. Farley
Attorney, Agent, or Firm—R. S. Sciascia; Q. E. Hodges

[57] ABSTRACT

A swimmer detection system and method which tests a remotely produced acoustic signal for frequency components in the range of the human heart beat rate. The received signal is tested by correlating a sample of the signal with a successively received segment of the signal. Good correlation signifies that the sample signal and successive segment of the signal are periodic and have components of the same frequency and hence the presence of a swimmer is likely.

7 Claims, 1 Drawing Figure

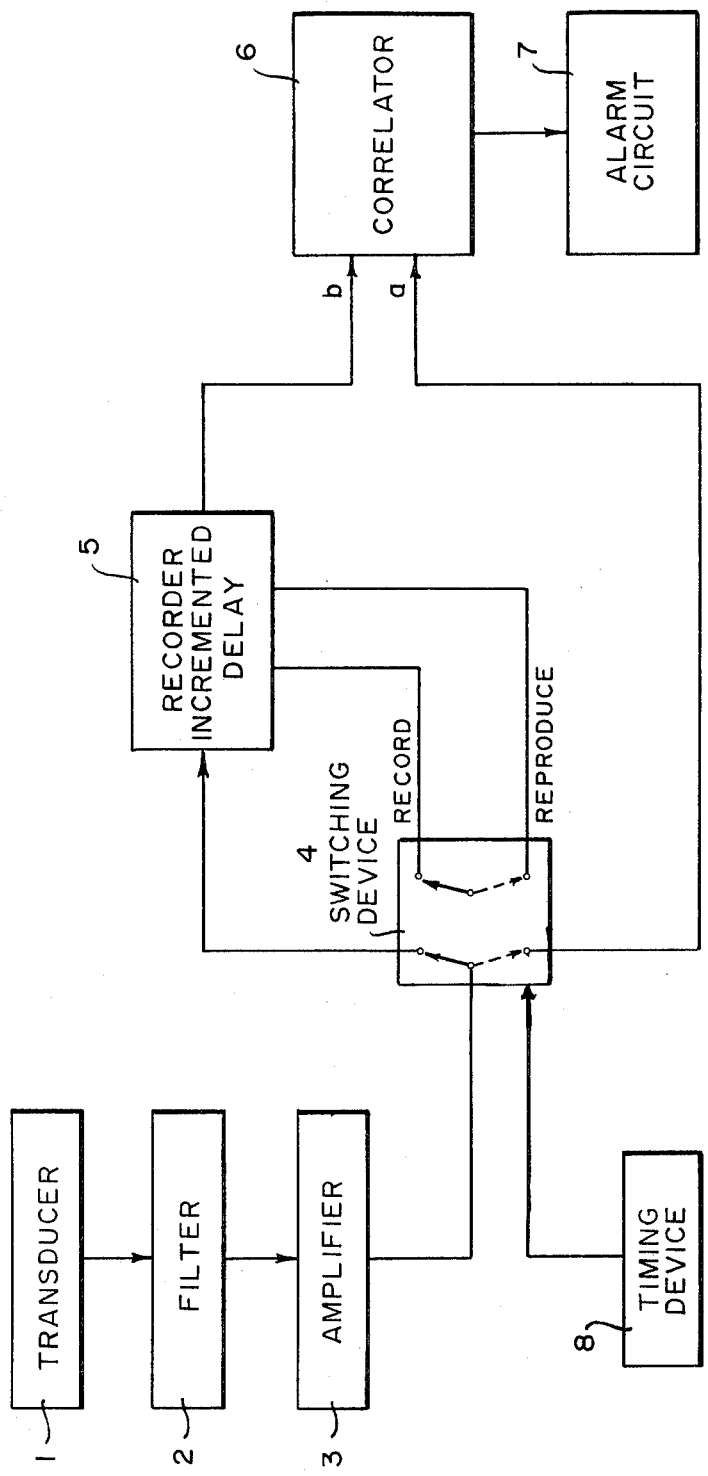

SWIMMER DETECTION SYSTEM FOR REMOTE OR LOCAL DEPLOYMENT

The invention described herein may be manufactured and used by or for the Government of the United States of America for Governmental purposes without the payment of any royalties thereon or therefor.

BACKGROUND OF THE INVENTION

The invention generally relates to the detection of periodic acoustic signals in water such as those produced by a swimmer's heartbeat and more specifically to the use of correlation techniques for such detection.

Presently, the best available method of detecting swimmers is to employ active acoustical radiating devices in conjunction with acoustical receivers and signal processing equipment. This method has shortcomings when the swimmer is at or near the surface of the water. It is inherently incapable of distinguishing between swimmers and waterborne inanimate objects such as tree trunks. Additionally, it requires large amounts of power, much larger than the system herein disclosed.

While the prior art contains various methods and apparatus for correlating signals directed to such purposes as ultrasonic inspection, geophysical prospecting, and recognition of detected echoes from remote objects, the prior art does not show a method which correlates acoustic radiation from a remote source such as a swimmer for detecting the presence of the swimmer in water.

SUMMARY OF THE INVENTION

The invention depends upon the periodic radiation of acoustic energy from the body of a swimmer, and in particular, but not limited to, the acoustic energy produced by the pulsations of the swimmer's beating heart. The heart pulsations are useful because they are very strong, highly periodic and represent a practically unsuppressible acoustical signal source.

The acoustic signals are detected in a conventional manner by a submerged hydrophone or sensitive pressure transducer. The received signal is passed through a low frequency or bandpass filter. A sample of the received signal is then recorded and correlated with successive segments of the received signal. The sample is delayed incrementally upon each correlation pass until the correlator produces a threshold signal or until a specified number of correlations has been performed. The production of a threshold signal signifies that the sample and the successive segment of the received signal are periodic and of the same frequency, indicative of a pulsating heart, and hence the presence of a swimmer is likely. If good correlation does not result from a number of correlation passes, then the sample is erased and the above process is repeated.

OBJECTS OF THE INVENTION

In accordance with the above, it is an object of this invention to provide a system for detecting radiation from a remote source and recognizing these radiations as emanating from a particular source.

It is another object of this invention to provide a means for correlating received radiations and identifying these radiations as coming from a swimmer.

It is a further object of this invention to recognize a swimmer in water at a remote location utilizing a recognition threshold to enhance reliability.

Other objects, advantages and novel features of the invention will become apparent from the following detailed description of the invention when considered in conjunction with the accompanying drawings, in which:

BRIEF DESCRIPTION OF THE DRAWINGS

The sole FIGURE shows a block diagram of the swimmer detection system of the invention.

DETAILED DESCRIPTION

Referring to the FIGURE, a mechanical to electrical transducer 1 is connected to a filter 2 which may either be a low pass filter, or, more preferably, a bandpass filter embracing the frequency range of the human heartbeat rate. The filter should preferably be an active filter to achieve the desirable characteristics of high input impedance, low output impedance, and excellent response at low frequencies. Filter 2 is connected to a conventional amplifier 3 which may be added to a conventional preamplifier generally used in conjunction with a transducer and recorder. The output of the amplifier 3 is coupled through a switching device 4 to a recorder 5. The switching device 4 is arranged in a first mode to connect the output signal of amplifier 3 to the input of recorder 5. In a second mode switching device 4 switches the output of amplifier 3 from the recorder to input $a$ of correlator 6 and also switches recorder 5 to the reproduce state thereby inputting the recorded sample to input $b$ of correlator 6. Correlator 6 may be a simple multiplier followed by an integrator. The output of correlator 6 may be connected to an alarm circuit 7 which is preset to a threshold level and remains unactuated until the correlator output signal equals or exceeds the threshold level.

For automatic operation a preset timing device 8, shown connected to switching device 4, shifts the system mode from record to reproduce and correlate. In the absence of an alarm circuit signal signifying a detection, the timing device 8 shifts the system mode back to record and the process is repeated.

In operation the transducer 1 converts a pressure signal from the swimmer into an electrical signal which is fed through active filter 2. The filter transmits only those signals within the frequency range of interest. The filter output is then amplified by amplifier 3 and applied through the switching device 4 to the recorder 5 which has been set in the record mode by the timing device 8.

The recorder then records a sample of the filter output. The timing device should be set to record at least 10 periods of the lowest frequency signal of interest. In this case, the lowest frequency signal of interest would be a heartbeat rate of 40 beats per minute which has a corresponding period of 1.6 seconds. A recorded sample would therefore be 16 seconds in duration.

At the end of the first sampling period, the timing device resets switch 4 so that the recorder 5 is placed in the reproduce state and the output of amplifier 3 is fed to the correlator input $a$. The recorder's reproduce output is fed simultaneously into correlator input $b$.

The function of the correlator is to determine whether or not input signals contain components of the same frequency. If on the first scanning of the record, the correlator output is too low to be significant the loop is delayed by approximately one tenth of the period of the lowest frequency of interest or in the case of 40 beats per second by 0.16 seconds. This delay may be by means of an impluse breaking or ratchet release or any other suitable means. When displaced, the record runs at the same rate but is displaced from its original running position so that the recorded signal is displaced in time. The entire loop is scanned again and correlated with the incoming signal. The process of repeated incremental delay and correlation should produce a significant correlator output in ten passes or less of the tape loop if there is a periodic component in the output of the transducer. A sufficiently high correlator output, above the threshold level of the alarm circuit 7 then triggers the alarm to indicate the presence of a swimmer. If at the end of 10 or less scanning passes, no significant correlation factor is detected, the loop is erased and another sample is recorded and the data processing cycle is repeated.

In an alternative embodiment, two samples of data can be recorded and the correlation function between the two samples could be determined by shifting the first data record relative to the second data record sample before connecting these signals to the correlator.

Obviously, many modifications and variations of the present invention are possible in the light of the above teachings. It is therefore to be understood that within the scope of the appended claims the invention may be practiced otherwise than as specifically described.

What is claimed is:

1. A swimmer detection system comprising:
   mechanical to electrical transducing means for receiving an acoustic signal;
   means for recording a sample of said acoustic signal, said recording means having an output for reproducing the recorded sample of said acoustic signal;
   means for correlating the recorded sample of said signal with a segment of said acoustic signal received successively to said recorded sample, said correlating means being operative to produce an output when said recorded sample and the successively received segment of said signal are periodic and of substantially the same frequency;
   switching means having at least two operative positions, a first position for connecting said transducing means to said recording means and a second position for connecting said transducing means to a first input of said correlating means and for changing the state of said recording means from record to reproduce, said recording means reproduce output being connected to a second input of said correlating means,
   whereby the recorded sample of said signal and the successively received segment of said signal are correlated; and
   timing means connected to said switching means for automatically changing the position of said switching means from its said first position to said second position.

2. The system according to claim 1 wherein said timing means is further operative to return said switching means to said first position in the absence of an output from saiid correlating means.

3. The system according to claim 1 including a threshold level alarm circuit connected to the output of said correlating means, said circuit being actuated in response to an output of said correlating means having a magnitude equal to or greater than a predetermined threshold whereby said threshold indicates the presence of a swimmer is likely.

4. The system of claim 1 including:
   means for time delaying said recording in the absence of a correlation output indicative of the presence of the swimmer and recorrelating the recording with successive segments of said received signal.

5. The system of claim 4, including:
   a bandpass filter connected between said transducing means and said recording means for passing frequency components in the range of those produced by a human heart.

6. A method for detecting a swimmer comprising:
   receiving a remotely produced acoustic signal;
   recording a sample of said received signal on a recorder;
   correlating the recorded sample signal with an acoustic signal received successively to said recorded sample signal;
   comparing the correlated signal with a predetermined threshold level, the magnitude of said level indicating the presence of a swimmer;
   incrementally delaying said recorded sample signal in the absence of a correlated signal level above said predetermined threshold;
   recorrelating the incrementally delayed recorded sample with successively received acoustic signals until the correlated signal level exceeds said threshold level; and
   erasing said recorded sample if said correlated signal level has a magnitude less than said predetermined threshold level.

7. The method of claim 6, wherein said delaying step includes the step of
   successively delaying the recording one-tenth of the period of the lowest frequency expected from the signal source.

* * * * *